INVENTOR.
GEORGE K. FARNEY
BY Harry E. Aine
ATTORNEY

June 4, 1968 G. K. FARNEY 3,387,169
SLOW WAVE STRUCTURE OF THE COMB TYPE HAVING STRAP MEANS
CONNECTING THE TEETH TO FORM ITERATIVE
INDUCTIVE SHUNT LOADING
Filed May 7, 1965 3 Sheets-Sheet 2

INVENTOR.
GEORGE K. FARNEY

BY
ATTORNEY

June 4, 1968  G. K. FARNEY  3,387,169
SLOW WAVE STRUCTURE OF THE COMB TYPE HAVING STRAP MEANS
CONNECTING THE TEETH TO FORM ITERATIVE
INDUCTIVE SHUNT LOADING
Filed May 7, 1965  3 Sheets-Sheet 3
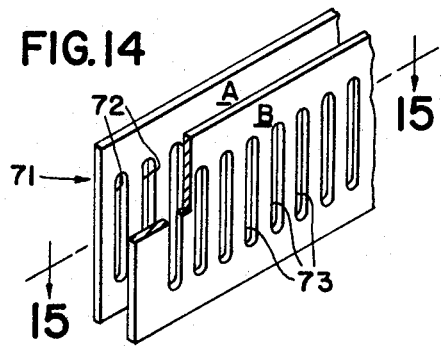
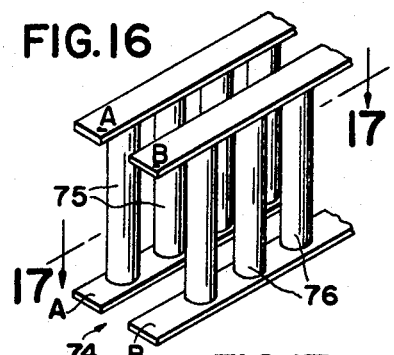
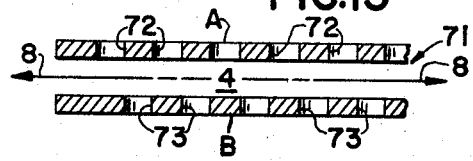
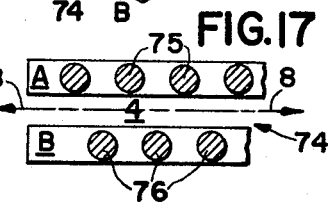
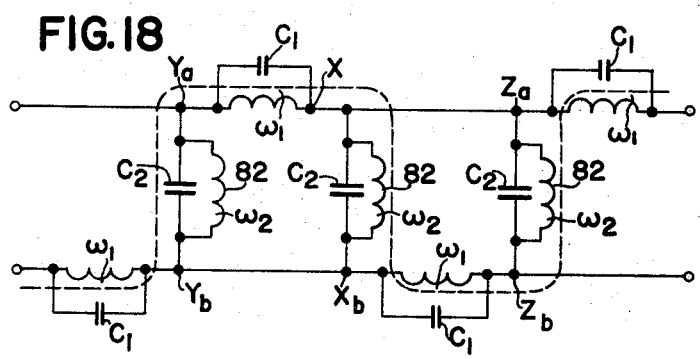
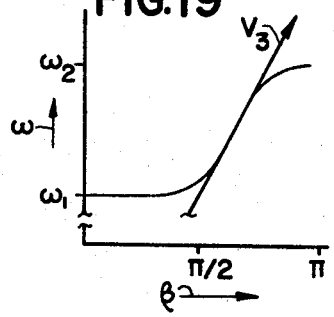
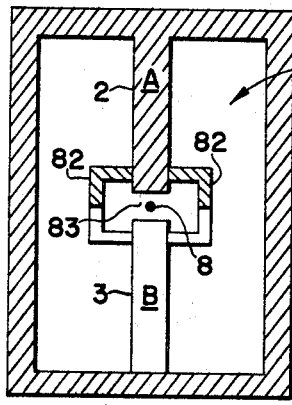
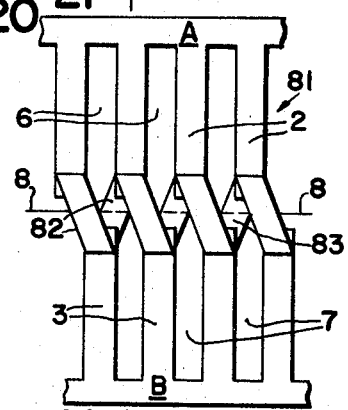
INVENTOR.
GEORGE K. FARNEY
BY
ATTORNEY

United States Patent Office 3,387,169
Patented June 4, 1968

3,387,169
SLOW WAVE STRUCTURE OF THE COMB TYPE HAVING STRAP MEANS CONNECTING THE TEETH TO FORM ITERATIVE INDUCTIVE SHUNT LOADINGS
George K. Farney, New Providence, N.J., assignor to S-F-D Laboratories, Inc., Union, N.J., a corporation of New Jersey
Filed May 7, 1965, Ser. No. 454,031
3 Claims. (Cl. 315—3.5)

ABSTRACT OF THE DISCLOSURE

An improved slow wave circuit and microwave tubes employing same are disclosed. The slow wave circuit includes a pair of conductor portions spaced apart to define an electronic interaction region therebetween. Each of the conductors is provided with an array of slots, bars or the like to define iterative series loading elements in each of the conductors. The series-loading elements in the two conductors are offset with respect to each other along the length of the line such that the electron stream successively and alternately interacts with the series voltages developed in first one of the conductors and then the other throughout the length of the circuit to produce an amplified output signal. An array of inductive coupling strap portions interconnect the first and second conductors to define an array of inductive shunt loading elements in the slow wave circuit. In a preferred embodiment, the inductive shunt-loading elements are resonated with the shunt capacity between the conductor portions of the slow wave circuit at a frequency above the resonant frequency of the series loading elements in each of the conductors of the slow wave circuit, whereby the circuit is caused to have a fundamental space harmonic forward wave interaction with a stream of electrons. In a preferred embodiment, the inductive coupling straps interconnecting the first and second conductors are formed by half turns of a helix shaped strap, whereby fabrication of the slow wave circuit is facilitated.

Figure 1:
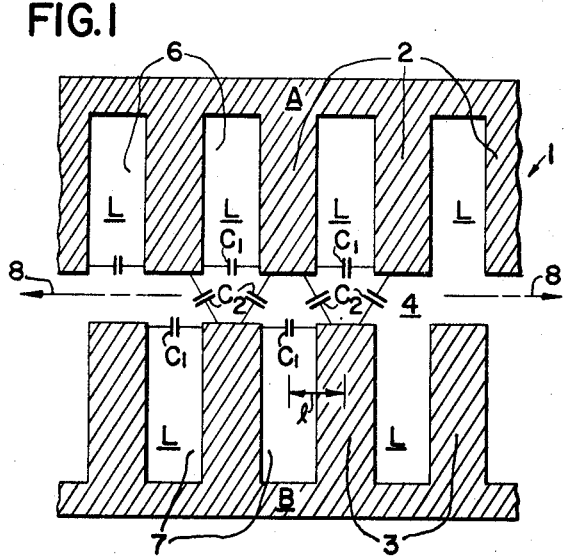

Heretofore the conventional backward wave oscillator circuit has been the helix. Backward wave oscillations are obtained by using the first space harmonic mode of operation since the circuit is a fundamental forward traveling wave circuit. However, this circuit has experienced limitations of power handling capacity and electronic tunable bandwidth. Interdigital lines are capable of providing increased power handling capability but have limited electronic interaction impedance because the electrons interact with the fringing electric fields and there are regions along the beam interaction path wherein the electrons are shielded from the R.F. fields of the slow wave circuit thereby deleteriously affecting gain and efficiency.

In the present invention, there is provided a novel circuit characterized by an alternating series type of electronic interaction whereby the electrons of the beam are not periodically shielded from the R.F. fields of the wave circuit and yet the circuit is formed of relatively rugged members, whereby a wide band, high gain, high efficiency and high thermal capacity fundamental backward or forward wave circuit is obtained which is especially useful for electronically tunable backward wave oscillators or forward wave amplifiers.

The principal object of the present invention is the provision of an improved slow wave circuit and enhanced performance for tubes employing same.

One feature of the present invention is the provision of a slow wave circuit having series reactive loading introduced alternately into opposite sides of mutually opposed conductor portions of a slow wave circuit for developing series R.F. voltages for successive electronic interaction with a stream of electrons, whereby a fundamental traveling wave mode of operation is achieved with attendant increase in electronic impedance and reduction in operating voltage.

Another feature of the present invention is the same as the preceding wherein the slow wave circuit is formed by a pair of mutually opposed comb-like conductors with the fingers of the combs slightly spaced apart at their free ends and with the combs axially displaced such that the ends of the fingers are disposed in out of registry relationship whereby a practical high thermal capacity electronic interaction circuit is obtained.

Another feature of the present invention is the same as the first feature wherein the slow wave circuit comprises a circuit wherein the series loading of one conductor takes the form of an array of resonant vanes formed therein and an array of resonant slots formed in the other conductor, the slots having their axes transversely directed to the longitudinal direction of the conductor containing the vanes and the slots of the one array being placed in vertical registry with the vane tips of the opposing vane array.

Another feature of the present invention is the same as any of the preceding features including the additional provision of inductive coupling members connected in shunt across the mutually opposed conductor portions to cause the slow wave circuit to have a high pass transmission characteristic whereby the slow wave circuit has a fundamental forward wave mode of operation.

Another feature of the present invention is the same as any of the preceding features including means for applying different D.C. operating potentials across said opposed conductor portions to develop an electric field vector therebetween and including a D.C. magnetic field oriented at right angles to the electric field vector and disposed in a plane transverse to the line of slow wave circuit development whereby the enhanced efficiency of magnetron or crossed field type interaction is obtained in the space between the conductor portions.

Figure 3:
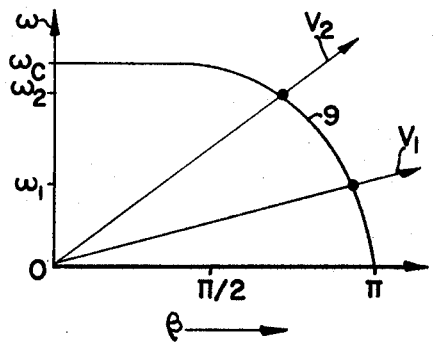
Figure 2:
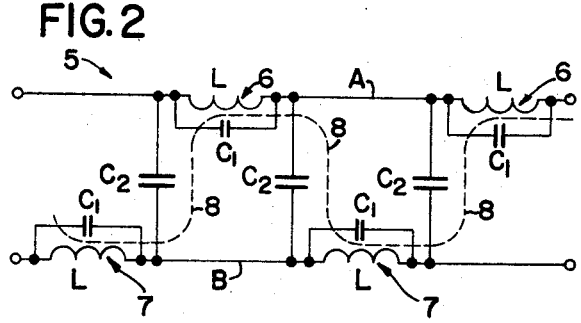
Figure 5:
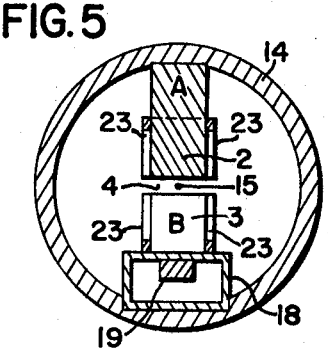
Figure 4:
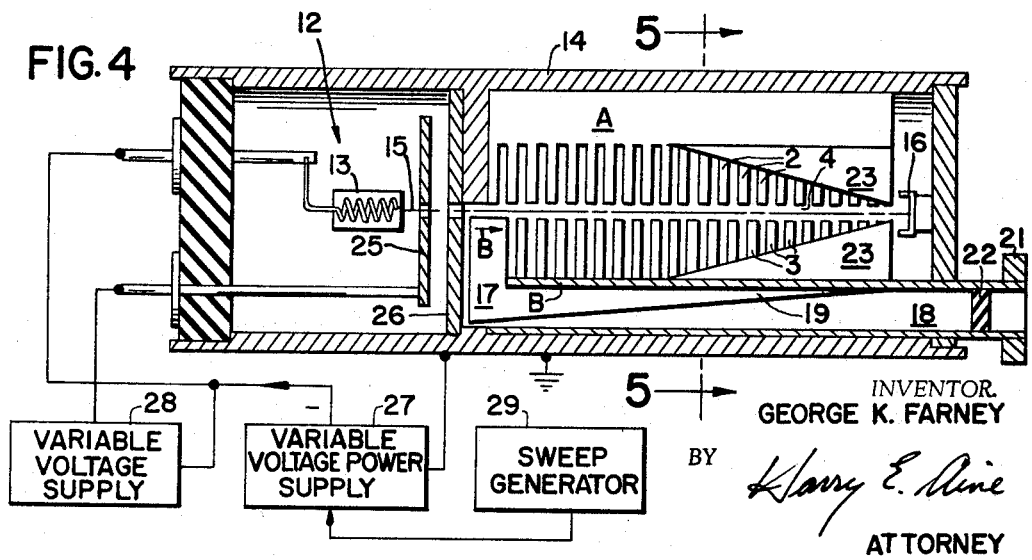
Figure 6:
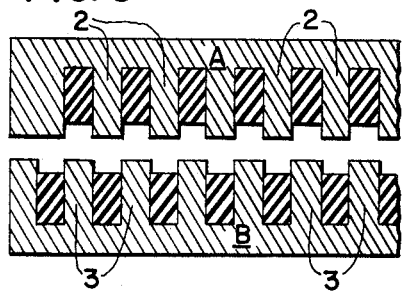
Figure 7:
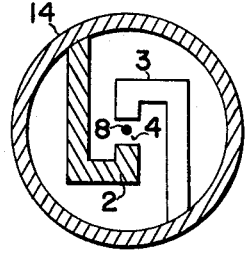
Figure 8:
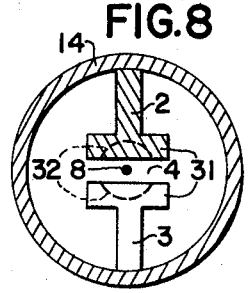
Figure 9:
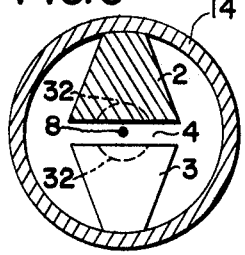
Figure 10:
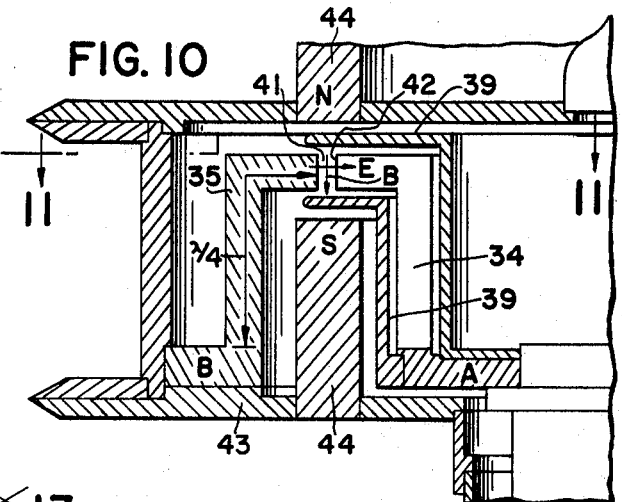
Figure 12:
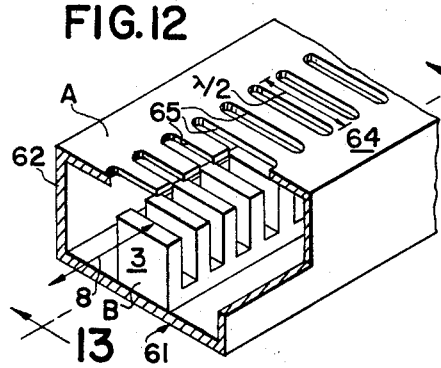
Figure 11:
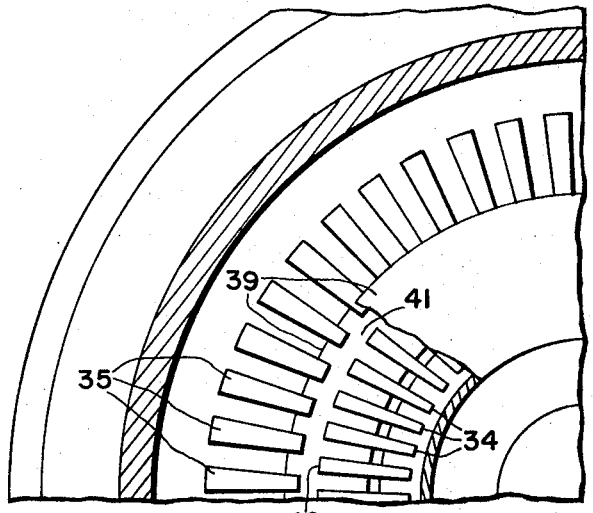
Figure 13:
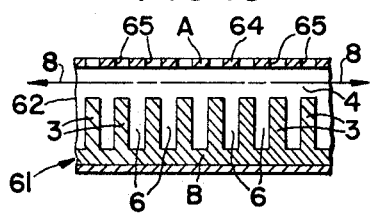

These and other features and advantages of the present invention will become more apparent upon a perusal of the following specification taken in conjunction with the accompanying drawing wherein:

FIG. 1 is a longitudinal sectional view of a slow wave circuit of the present invention, FIG. 2 is a schematic lumped constant equivalent circuit for the slow wave circuit of FIG. 1, FIG. 3 is an $\omega$ vs. $\beta$ diagram for the circuit of FIG. 1, FIG. 4 is a longitudinal sectional view of a backward wave oscillator tube incorporating the novel slow wave circuit of the present invention, FIG. 5 is an enlarged transverse sectional view of the structure of FIG. 4 taken along line 5—5 in the direction of the arrows, FIG. 6 is a longitudinal side elevation view of a dielectrically loaded slow wave circuit of FIG. 1 as loaded for lower frequency operation, FIG. 7 is a transverse secional view of an alternative low frequency version of the circuit of FIG. 1, FIG. 8 is an alternative slow wave structure to that of FIG. 7, FIG. 9 is another alternative slow wave structure of FIG. 7, FIG. 10 is a fragmentary longitudinal sectional view of a circular crossed field noise source tube employing the novel circuit of the present invention, FIG. 11 is a transverse sectional view of the structure of FIG. 10 taken along line 11—11 in the direction of the arrows, FIG. 12 is a perspective view of an alternative slow wave circuit employing features of the present invention, FIG. 13 is a fragmentary sectional view of the circuit of FIG. 12 taken along line 13—13 in the direction of the arrows, FIG. 14 is a longitudinal perspective view of an alternative slot circuit employing features of the present invention, FIG. 15 is an enlarged longitudinal sectional view of the structure of FIG. 14 taken along line 15—15 in the direction of the arrows, FIG. 16 is a longitudinal perspective view partly broken away of an alternative slow wave circuit employing features of the present invention, FIG. 17 is an enlarged fragmentary cross sectional view of a portion of the structure of FIG. 16 taken along line 17—17 in the direction of the arrows, FIG. 18 is a lumped constant equivalent circuit to the alternative slow wave circuit of FIGS. 20 and 21, FIG. 19 is a dispersion curve for the alternative slow wave circuit of FIGS. 20 and 21, FIG. 20 is a longitudinal view partly broken away of an alternative forward wave fundamental mode slow wave circuit of the present invention, and FIG. 21 is a transverse sectional view of the structure of FIG. 20 taken along line 21—21 in the direction of the arrows.

Referring now to FIG. 1 there is shown in longitudinal section a slow wave circuit 1 of the present invention. The circuit 1 comprises a pair of elongated conductor portions A and B as of copper extending in the direction of circuit development, the mean direction of power flow on the circuit. Each conductor portion A and B, respectively, has formed therein an array of resonant vane members 2 and 3. The vane arrays 2 and 3 project from the conductors A and B toward each other in slightly spaced apart relation like two combs with the free ends of the teeth facing each other in slightly spaced relation. In addition, the vane arrays 2 and 3 are slightly axially displaced with respect to each other such that the tips of the opposed vane members 2 and 3 are out of mutually opposed registry, i.e., the tips of one vane array are opposite the slots between vanes in the other array.

A wave on the circuit 1 interacts with electrons in the interaction gap region 4 defined by the space between the vane arrays 2 and 3. The circuit 1 may be used with linear beam geometries or with crossed D.C. electric and D.C. magnetic field geometries of either circular or linear tube configurations as will be more fully described below.

An equivalent lumped element circuit 5 for the circuit of FIG. 1 is shown in FIG. 2. As can be seen from the circuit 5 the slots 6 and 7 between adjacent vanes 2 and 3, respectively, form a parallel resonant circuit comprised of inductance L and capacitance $C_1$. The resonant frequency of slots 6 determine the high frequency cut off $\omega_c$ of the circuit 1, and this occurs when the slot length is about a quarter wavelength long. This resonant circuit element 6 is repetitive and alternates in position on successively opposite sides or conductors A and B, respectively, of the transmission line or circuit 5. There is capacitance between the mutually opposed arrays of vane tips which shows up in the circuit as shunting capacitance $C_2$.

In the interaction region 4, an electron traveling in the direction of circuit development 8 successively interacts with the electric fields of capacitances $C_1$ on successively opposite sides of the transmission line and essentially does not interact with the fields of the shunt capacitances $C_2$. Such electronic interaction can be described as alternating series interaction.

In the first pass band this circuit has a low pass characteristic and has a backward wave fundamental mode of operation, as can be seen by reference to FIG. 3 wherein the dispersion curve 9 is shown for the circuit 1 of FIG. 1. Notice that over the pass band of the circuit the shift, B, per period, $l$, is concentrated largely in the range of $$\frac{\pi}{2} < \beta < \pi$$

This means that the circuit 1 will have higher electronic interaction impedance than the conventional helix or interdigital line circuits. This increased electronic interaction impedance leads to advantages of greater signal to noise ratio, smaller size, lower operating voltages for a specified power level, and reduced weight because of reduced beam focusing magnetic field requirements resulting from the shorter over all length of the tube. Also the comb circuit structure of the present invention has much higher thermal capacity and is more rugged than the conventional helix thereby allowing greater power output since more power may be dissipated on the circuit.

This circuit 1 has lower operating voltages than those used for prior interdigital line circuits because the cell spacing, i.e., space, $l$, between successive electronic interaction voltages taken along the beam path for a given phase shift has been reduced in half. A cell spacing reduction of 50% leads to a voltage reduction for synchronous interaction by a factor of 4. This, of course, leads to a tube which is much more desirable for many applications. This arrangement not only permits many circuit wavelengths to be obtained in a short length of circuit, but the low voltage operation, as found with helix backward wave circuits, is obtained in a circuit that is physically and thermally rugged.

The slow wave circuit 1 can be fabricated quite readily for use at frequencies ranging from L-band to millimeter waves. The dimensions of the quarter wave loading elements, slots 6 and 7, are still quite practical at frequencies between 75 and 100 gc., whereas at L-band the loading elements become long. In the latter case, size reduction can be achieved by dielectric loading of the slots and/or introducing convolutions in the circuit geometry or by using axe- or T-shaped vanes all more fully described below. Furthermore, most slow wave circuits scale in such a fashion that the cross-sectional area available for electron beams scales also with frequency. This is not so with the new circuit of FIG. 1. The operating frequency is determined by the slot length dimension and must be scaled accordingly. However, the interaction gap or space 4 between the halves of the slow wave circuit does not have to be reduced in the same way. This dimension is more properly dictated by the slot width which, in turn, is selected by the operating voltage of the tube. Because of this, an arrangement will be possible with more room for the electron stream whereby more beam current can be launched through the slow wave circuit than is possible with other prior millimeter wave, slow wave circuits. This permits a voltage tunable oscillator at millimeter frequencies with greater power output.

The slot arrays 6 and 7 in conductors A and B need not be of equal length. In fact mode separation may be obtained in the same manner as in a rising-sun magnetron by making the slots 6 of one array of a different length than the slots 7 of the other array to thereby produce slightly different resonant frequencies for the resonant slots of the two arrays 6 and 7, respectively. In this manner, a stop band is introduced which allows mode separation and dispersion curve shaping thereby minimizing band edge operation in unwanted modes.

Referring now to FIGS. 4 and 5 there is shown a linear backward wave oscillator tube employing the alternating series interaction circuit of FIG. 1. A conventional gun assembly 12 including a thermionic cathode emitter 13 is disposed at one end of a cylindrical metallic vacuum tight envelope 14 as of copper for forming and projecting a beam of electrons 15 over a linear beam path to a collecting electrode 16 which is disposed at and closes off the other end of the vacuum envelope 14. A solenoid or other conventional magnetic circuit, not shown, supplies an axially directed beam focusing magnetic field B for confining the beam to the desired beam path 15.

A slow wave circuit 1 of the type shown and described in FIG. 1 is disposed along the beam path 15 intermediate the gun 12 and collector 16 for electronic interaction with the beam 15 passable therethrough. An output waveguide connection is made at 17 to the upstream end of the slow wave circuit 1 for extracting output signal energy to a suitable load, not shown. A conventional waveguide 18 is matched to the terminal connection 17 by means of a tapered ridged waveguide section 19. The output waveguide is flanged at 21 and includes a vacuum tight wave permeable window 22.

Tapered height sections of lossy material 23, as of carbon impregnated alumina ceramic, are held against the downstream portion of the slow wave circuit to attenuate forward wave energy on the circuit and to absorb any such reflected forward waves traveling in the backward direction at the downstream end of the circuit to prevent backward wave amplification thereof which would otherwise cause spurious oscillations.

A beam current control electrode or grid 25 is disposed between the emitter 13 and the conventional anode 26 of the gun assembly 12 for controlling the beam current intensity. A variable voltage power supply 27 supplies a suitably variable negative voltage to the emitter 13 relative to the potentials of the control grid 25 and anode 26 to control the beam voltage. Another variable voltage supply 28 is connected to the control electrode 25 for operating same at any desired voltage.

In operation, a backward fundamental circuit wave propagating on the slow wave circuit 1 cumulatively interacts with the electron beam 15 in the conventional backward wave oscillator mode of operation to produce an output microwave signal at terminal 17. The frequency of the output signal varies according to the beam voltage over a range from $\omega_1$ to $\omega_2$ of FIG. 3. A sweep generator 29 sweeps the beam voltage via the variable voltage supply 27 to sweep the output frequency over the range of $\omega_1$ to $\omega_2$.

In a typical example of a backward wave oscillator tube of the linear type according to FIGS. 4 and 5, the slow wave circuit 1 had the following dimensions for operation over a band having an upper cut off frequency $\omega_c$ between 11 and 12 gc.: Overall length of the circuit 1.5"; height of each half of the circuit including vanes 2 and 3 and base portions 0.355"; 24 vanes and slots in each comb-like half of the circuit; each slot and each vane being of equal thickness of 0.030"; and the slots 6 being 0.230" deep; and the vanes having a width in the direction transverse to the line of circuit development 8 of 0.050".

Referring now to FIG. 6 there is shown an alternative low frequency version of the circuit 1 of FIG. 1 wherein dielectric loading in the form of dielectric blocks as of alumina ceramic are positioned in the slots 6 to shorten the physical length of the slots 6 for a given electrical length.

Referring now to FIG. 7 there is shown an alternative vane structure to that shown in FIGS. 1, 4–6 wherein the vanes 2 and 3 are formed of an L-shape such that they may be formed of the requisite length for low frequency operation but contained within an envelope of limited transverse dimensions. Other reverse or convoluted shapes may be advantageously employed to this end such as S- or Z-shaped vanes, not shown.

Referring now to FIG. 8 there is shown a preferred vane configuration wherein the tip portion is enlarged to form a T-shaped vane. The enlarged vane tip portion at 31 concentrates the electric field in the desired electronic interaction region 4 and further tends to physically shorten the length of the vane and slot depth. In addition, the enlarged tip portion may be cut out as indicated by the dotted line 32 to enlarge the beam field electronic interaction region of the circuit thereby obtaining enhanced utilization of the electronic interaction impedance of the circuit. This vane end cut out feature may be employed whether the vane tip is enlarged or not and on circular or linear type tubes.

Referring now to FIG. 9 there is shown still another modified vane shape which is characterized as axe-shape. This axe-shape tends to concentrate and increase the capacitance of the vane structure for a given frequency at the tip portions which are adjacent the electronic interaction region 4 thereby increasing the electronic interaction impedance and decreasing the length of the vanes for a given frequency. As before the vane tips may be advantageously cut out at 32 to accommodate a larger cross section beam.

Although the circuit of FIG. 7 is shown as a linearized version it may readily be formed in arcuate shape for use in circular crossed field tubes. Such a circular tube design is shown in FIGS. 10 and 11.

Referring now to FIGS. 10 and 11 there is shown a circular type crossed field noise tube using the alternating series element interaction circuit 1 of the present invention. In this case the vanes 34 of the circular inner conductor A have been given an inverted L-shape in order to provide sufficient length to the vanes 34 in a convenient manner compatible with a concentric circular geometry for slotted conductors A and B. The vanes 34 are approximately a quarter wavelength long at the upper cut off frequency $\omega_c$ of the tube. Likewise vanes 35 of conductor B have an L-shape and are disposed in peripherally displaced relation with their vane tips out of radial registry with the mutually opposed vane tips of the other array 34. The opposed vanes thereby define an annular electronic interaction gap 41. One of the vane arrays is operated at a high negative D.C. potential relative to the other array whereby one array forms the anode and the other the cathode emitter sole. Preferably the inner array 34 is operated at negative potential relative to the anode array 35 thereby making vane array 34 the cathode with the vane tips at 42 forming the emitting sole.

A pair of tubular end hats 39 as of molybdenum and having a generally L-shape, in longitudinal section, confine the electron stream to the desired interaction gap 41.

The cathode vane array 34 is supported from a conventional surrounding metallic vacuum envelope 43 via the intermediary of a conventional high voltage insulator assembly and cathode stem, not shown. A conventional magnetron magnetic circuit, only partially shown, produces an axially directed D.C. magnetic field B in the interaction region 41. In a preferred embodiment, the D.C. magnetic circuit includes a pair of internal cylindrical pole pieces 44, as of iron, for decreasing the gap length of the magnetic circuit. The cathode preferably includes a starting thermionic emitter 46 and a circuit sever 47, not shown, both for the anode and cathode circuits. In addition, a lossy termination 23 at the downstream end of the circuit, not shown in FIGS. 10 and 11, is provided for attenuating reflected backward waves.

The tube of FIGS. 10 and 11 is operable in the backward wave amplifier mode, similar to the oscillator mode as previously described with regard to FIGS. 4 and 5, but operating below sustained coherent oscillation current levels to produce voltage tunable noise power output of approximately 10% instantaneous bandwidth over a freqency range of on the order of an octave.

Referring now to FIGS. 12 and 13 there is shown an alternative embodiment of the alternating series interaction circuit of the present invention. In this embodiment the slow wave circuit 61 comprises a ridged waveguide 62. The ridge 63 of the guide is transversely slotted at 6 to form one comb-like conductor portion B of the circuit 1 as prevously described with regard to FIGS. 1–11. However the other mutually opposed conductor portion A of the circuit 61 comprises a transversely slotted metallic sheet or wall 64. The slots 65 form an array of resonant elements in series with the opposed conductor portion or wall A. The resonant frequency of the slots 65 and/or the slots 6 determines the upper cut off frequency of the circuit 61. The slots 65 will have a resonant frequency when their length is one half a wavelength long λ/2. The slots 65 are axially displaced in the direction of circuit development 8 with respect to the slots 6 such that the slots 65 are in vertical registry with the vanes 3. The circuit 61 has the same shape dispersion curve 9 as shown in FIG. 3 for the circuit of FIG. 1.

In use, the fields of circuit 61 of FIGS. 12 and 13 interact with a stream of electrons in the interaction region 4 between conductor A and the vane tips in the alternating series manner as previously described. Also the circuit is readily adapted for crossed D.C. electric and magnetic field tube geometries either with emitting sole or injected beam optics by insulating conductor portion A from conductor portion B and applying operating D.C. potentials thereacross.

Referring now to FIGS. 14 and 15 there is shown a slotted wall type alternative embodiment of the alternating series type slow wave circuit of the present invention. Briefly, the circuit 71 comprises a pair of mutually opposed walls A and B, respectively, as of copper defining a two wire derived transmission line as previously described. The conductor walls A and B are transversely slotted to form two slot arrays 72 and 73, respectively, on conductors A and B. The slots form resonant elements in series with each of the conductors A and B and the positions of the two slot arrays 72 and 73 are displaced with respect to each other in the direction of circuit development 8 such that they are located in out of transverse registry, as previously described. The slots 72 and 73 have a resonant frequency corresponding to the slots being a half wavelength long and this resonant frequency determines the high frequency cut off $\omega_c$ of the circuit 71 in the manner as previously described for the circuit of FIG. 1. In addition, the circuit 71 has a dispersion curve 9 as shown in FIG. 3. The slot type alternating series circuit 71 interacts with electrons in the interaction region 4 between the conductors A and B in the manner as previously described above. This circuit 71 may be used in linear beam tubes of the type described in FIG. 4 or in crossed field tubes either of the circular or linear type.

Referring now to FIGS. 16 and 17 there is shown a bar type alternating series interaction slow wave circuit 74 embodiment of the present invention. In circuit 74, the two conductor portions A and B define a two wire derived transmission line. A first array of conductive resonant bars 75 is connected transversely across conductor A to place the bars 75 in series with conductors A. Likewise an array of resonant bars 76 is connected transversely across conductors B to place the bars 76 electrically in series with conductor B. The bar arrays 75 and 76 are displaced with respect to each other in the direction of circuit development 8 such that the bars 75 and 76 are located in out of transverse registry with each other as previously described above.

The bars 75 and 76 have a resonant frequency corresponding to their being a half wavelength long and this resonant frequency determines the high frequency cut off $\omega_c$ of the circuit 74 in the manner as previously described for the circuit of FIG. 1. The circuit 74 has a dispersion curve 9 as shown in FIG. 3.

The bar type alternating series slow wave circuit 74 interacts with electrons in the interaction region 4 between the conductors A and B in the manner as previously described above. This bar circuit 74 may be used in linear beam tubes, FIGS. 4 and 5, or in crossed field tubes either of the circular (FIGS. 10 and 11) or linear type. The bar circuit is conveniently cooled by making bars 75 and 76 hollow and by passing a fluid coolant through the hollow bars.

Thus far in the description, the alternating series interaction circuit has been described as it is employed for backward wave fundamental mode operation. Thus making it especially useful for backward wave devices such as backward wave oscillators or amplifiers. It turns out that the alternating series circuit is fundamentally backward wave when it has a low pass wave transmission characteristic, i.e., the shunting elements look capacitive, at frequencies within the pass band, and the series elements look inductive within the pass band.

However, the alternating series interaction circuit may have a fundamental forward wave mode of operation if the shunting elements are made to look inductive within the pass band and the series elements are made to look capacitive. This latter result is obtained if the shunting element includes an additional inductive member thereby forming a resonant element and the capacitive and inductive portions of the shunting element are caused to have a resonant frequency $\omega_2$ which determines the upper cut off frequency and thus is above the pass band of the circuit. The resonant frequency $\omega_1$ of the series elements thus determines the low frequency cut off of the circuit.

Referring now to FIGS. 18–21 there is shown in FIGS. 20 and 21 a slow wave structure providing alternating series interaction and having a fundamental forward wave mode of operation. The equivalent circuit for the slow wave circuit of FIGS. 20 and 21 is shown in FIG. 18 and its dispersion characteristic is shown in FIG. 19.

The forward wave slow wave circuit 81 is similar to previously described circuits, above, except that inductive strapping members 82 as of copper are connected in shunt across the transmission line formed by conductors A and B, said inductive members 82 being parallel resonated with capacitances $C_2$ to provide a resonant shunting circuit with a resonant frequency $\omega_2$ above the resonant frequency of the series slot arrays 6 and 7.

The electron beam is projected along the line of circuit development 8 with a synchronous beam voltage $V_3$ for interaction predominately only with the series voltages in alternate conductors A and B. This is accomplished by predominately limiting the cross section region of the beam to the region of fields of the circuit containing the series voltages, as indicated in FIG. 21 by the dotted line 83 delineating the outer periphery of the beam.

At first blush the circuit 81 of FIGS. 20 and 21 looks like a stub supported helix. This is true because the strapping members 82 are preferably formed by brazing both halves of a copper tube on opposite sides of the opposed comb-like conductors A and B and then slotting the tube with an array of diagonal cuts the pitch of the cuts being equal and opposite on opposite sides of the vanes 2 and 3. The remaining uncut portion of the tube forms a helix which couples together the vane members intermediate their lengths. However, it will be noted that the interaction slow wave circuit formed is not the equivalent of a stub supported helix because the beam is not substantially interacted with the electric fields between adjacent turns of the helix, as is best seen by reference to FIG. 21. Rather, as previously pointed out, the beam is predominately interacted only with the series voltages, i.e., voltages developed in series with conductors A and B.

The circuit 81 has a fundamental forward wave mode of operation with the phase shift per section B being concentrated in the region of $\pi/2$ to $\pi$ over the operating pass band of the circuit. This feature of the circuit permits increased interaction impedance, gain, and lower voltage operation over other fundamental forward wave circuits with phase shifts per section extending from 0 to $\pi$ over the pass band.

Other forms of the alternating series interaction circuit as shown in FIGS. 6–9, 12–17, may advantageously employ inductive shunting straps connected across the line in parallel with the shunting capacitance $C_2$ to form a forward wave fundamental mode circuit as previously described for the circuit of FIG. 1.

The above circuits have been described for their fundamental mode of operation in the first pass band. Of course, their circuits may be operated in other higher space harmonic modes and higher pass bands as are other more conventional slow wave circuits.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In a high frequency tube apparatus, means forming a slow wave circuit having first and second mutually opposed elongated radio frequency conductor portions extending in a direction of circuit development and defining an electronic interaction region between said first and second conductor portions, means for producing a stream of electrons in said interaction region for interaction with the fields of said slow wave circuit, iterative means in each of said first and second conductor portions for developing a succession of R.F. voltages in series with each of said conductor portions of said slow wave circuit, means for causing the electrons of said stream to successively alternately interact with said series voltages developed in said first and second conductors to produce a cumulative net electronic interaction between a wave traveling on said slow wave circuit and said stream of electrons, the improvement comprising, means forming an array of conductive coupling straps interconnecting said first and second conductor portions to form an iterative inductive shunt loading in said slow wave circuit, said straps being dimensioned to cause said slow wave circuit to have fundamental forward wave space harmonic mode of operation with the electrons.

2. The apparatus of claim 1 wherein said array of inductive coupling straps is formed by a helix-shaped strap conductor interconnecting said first and second conductor portions at each half turn of said helix-shaped strap.

3. The apparatus according to claim 2 wherein said series loaded first and second conductor portions are comb-shaped metallic structures with the teeth of said combs being offset by approximately one-half a period of the comb structures taken in the direction along the axis of the comb structures.

References Cited

UNITED STATES PATENTS

| 2,567,748 | 9/1951 | White | 333—31 |
| 2,945,981 | 7/1960 | Karp | 315—3.5 |
| 3,198,979 | 8/1965 | Sidoti | 333—31 X |
| 3,227,914 | 1/1966 | Birdsall et al. | 315—3.5 |
| 3,243,735 | 3/1966 | Gross | 315—3.5 X |
| 3,254,262 | 5/1966 | Hull | 315—3.5 |

HERMAN KARL SAALBACH, *Primary Examiner.*

S. C. HATMON, *Assistant Examiner.*